Figure 2A:
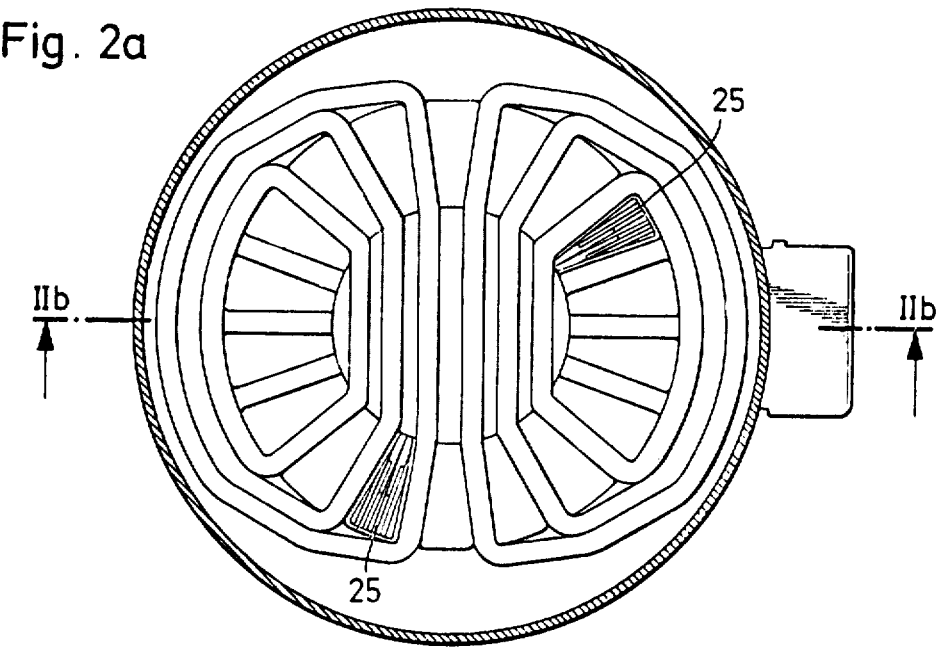

United States Patent [19]

Hayward

[11] 4,051,401
[45] Sept. 27, 1977

[54] MAGNETIC LOOPS CLOSURE ELEMENTS FOR ELECTRIC MOTOR

[76] Inventor: William George Hayward, 76 Woodcrest Walk, Reigate, Surrey, England

[21] Appl. No.: 691,288

[22] Filed: June 1, 1976

[30] Foreign Application Priority Data

June 2, 1975  United Kingdom ............... 23773/75

[51] Int. Cl.² .............................................. H02K 1/06
[52] U.S. Cl. .................................. 310/216; 310/166; 310/257; 310/254
[58] Field of Search ............... 310/166, 157, 190–193, 310/254, 216–218; 417/420

[56] References Cited

U.S. PATENT DOCUMENTS

3,814,963  6/1974  Laing ............................ 310/166 X

FOREIGN PATENT DOCUMENTS

2,358,025  6/1974  Germany .......................... 310/157

Primary Examiner—Donovan F. Duggan
Attorney, Agent, or Firm—Pennie & Edmonds

[57] ABSTRACT

A spherical air gap motor wherein the magnetic ring closing the stator magnetic loop has a non-cylindrical shape.

4 Claims, 5 Drawing Figures

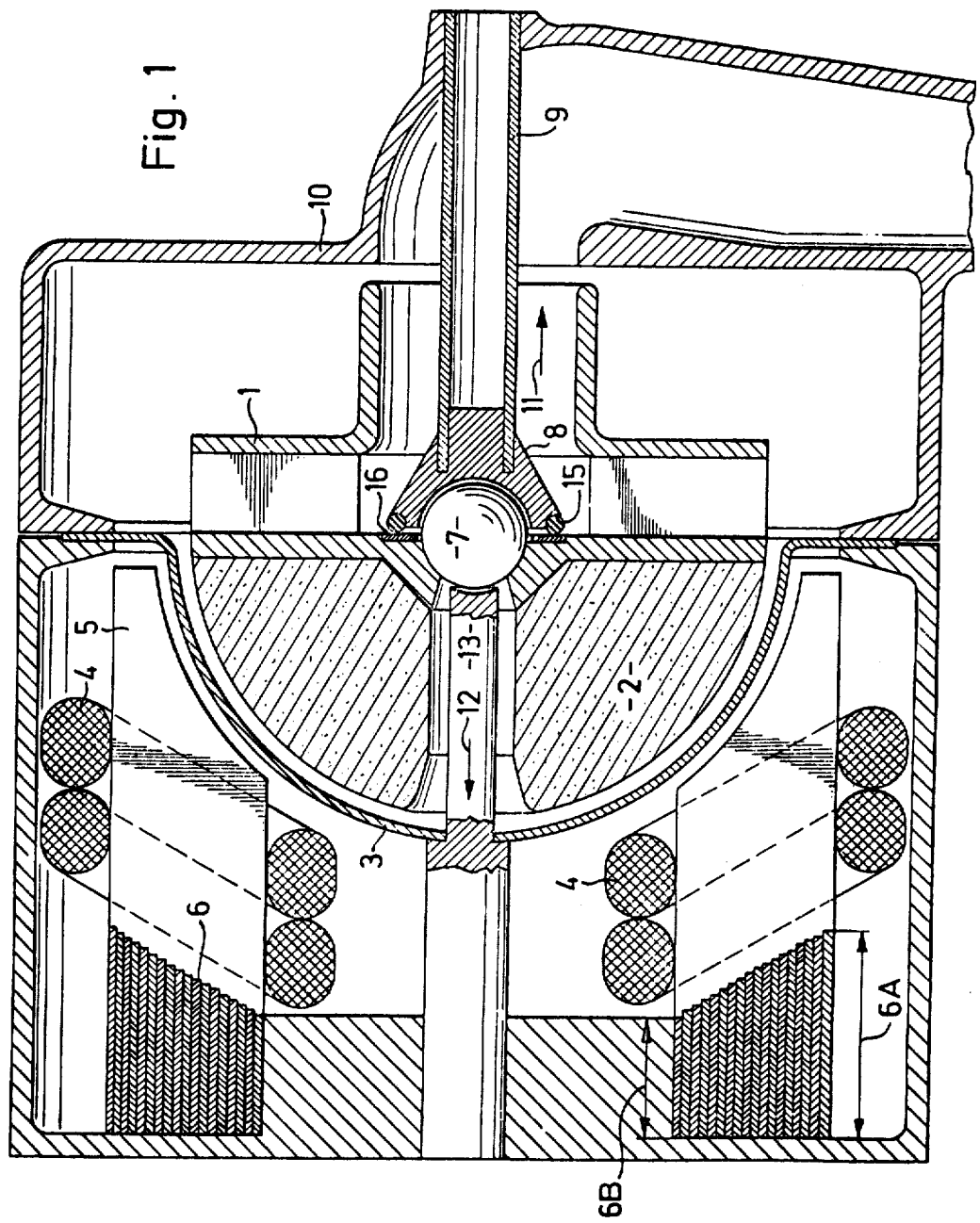

MAGNETIC LOOPS CLOSURE ELEMENTS FOR ELECTRIC MOTOR

THE PRIOR ART

Electric Motors with a spherical "air gap" have been used in pump drives, particularly for hermetically sealed chemical pumps. These motors consist of a ring of poleteeth made of magnetically soft iron, with the coils arranged between them. The magnetic connection between the teeth is arranged at one axial end by a ring or disc built up of iron sheets.

THE OBJECT OF THE INVENTION

It is an object of the invention to improve the efficiency and the material utilization of an electric motor having a spherical magnetic gap.

DESCRIPTION OF THE INVENTION

It has been found that the efficiency, as well as the material utilisation, of such a motor is greatly improved when this ring or disc provided for closing the magnetic loop, has a non-cylindrical shape. This geometry achieves a more uniform flux distribution in the cross-sections of the bodies forming the magnetic loop.

Thus, the invention resides in an electrical motor with teeth situated between two imaginary cylinders, made of magnetically soft iron which protrude through windings lying approximately in planes of rotation, a rotor which conducts the magnetic flux of the teeth at one axial end of the ring of teeth and of a circular magnetic loop closure element such that the laminations of the closure element which adjoin the stator winding have a smaller diameter than the sheets on the side opposite to that of the winding.

Alternatively, the invention can also be embodied with an annular magnetic loop closure element consisting of either nested sheet metal rings or spirally wound metal strip such that the axial length of the magnetic loop closure ring is larger in the outside region where the diameter is larger than in the region where the diameter is small.

The invention will be described with the help of figures.

FIG. 1 shows a motor according to the invention, in which the teeth 5 protrude through the coils 4 and drive the armature 2. At the axial end opposite the armature, the teeth 5 are magnetically interconnected via a magnetic loop closure ring 6. This ring may consist of a plurality of sheet metal rings of different diameters or of a spirally wound strip coil forming different laminations. According to the invention, the outside lamination has a larger axial extension 6A than an inside lamination such that the cross-sectional area of the outside lamination forms a portion defined by the thickness of the lamination times the axial length 6A which is greater than the cross-sectional area of an inner lamination having the same thickness but of a shorter axial length 6B. As shown portions of the loop elements having greater axial lengths are associated with or adjoin portions of the pole teeth of greater diameter while portions of the loop elements having a lesser axial length are associated with or adjoin portions of the pole teeth having lesser diameters inside lamination B. The aim of the invention may be achieved in this manner.

Figure 2B:
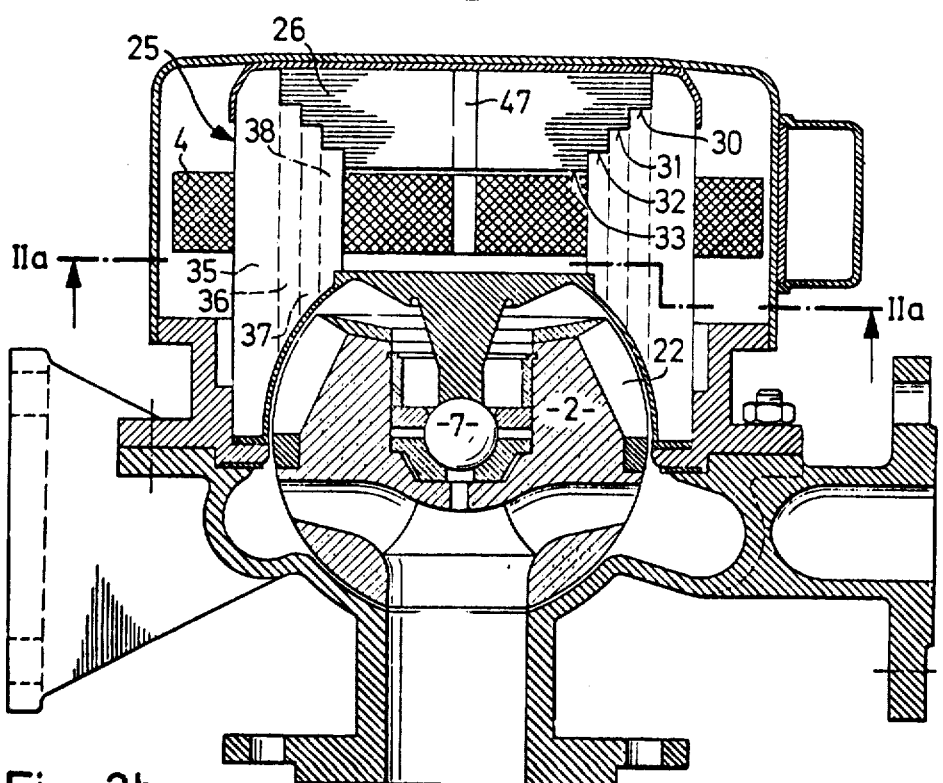

FIG. 2 shows a motor of similar type in which, however, sheet metal discs 26 serve to close the loop for the magnetic flux through the teeth 24. According to the invention, these discs 26 are formed in several steps 30, 31, 32, 23. The tooth 25 is an assembly of sheet metal blanks 35 situated on the outside, blanks 36 situated further inside, blanks 37, even further inside and the innermost blanks 38, which have the full radial spread. As shown the cross-sectional area of portions of the discs 26 of greater diameter forming step 30 and associated with blank 35 of greater diameter is greater than the cross-sectional area of portions of the discs 26 forming steps 31–33 which are associated with blanks 36–38 of lesser diameter. In this way, a uniform flux distribution is ensured between the armature 22 and the magnetic loop closure stack of stepped discs 26.

Figure 3A:
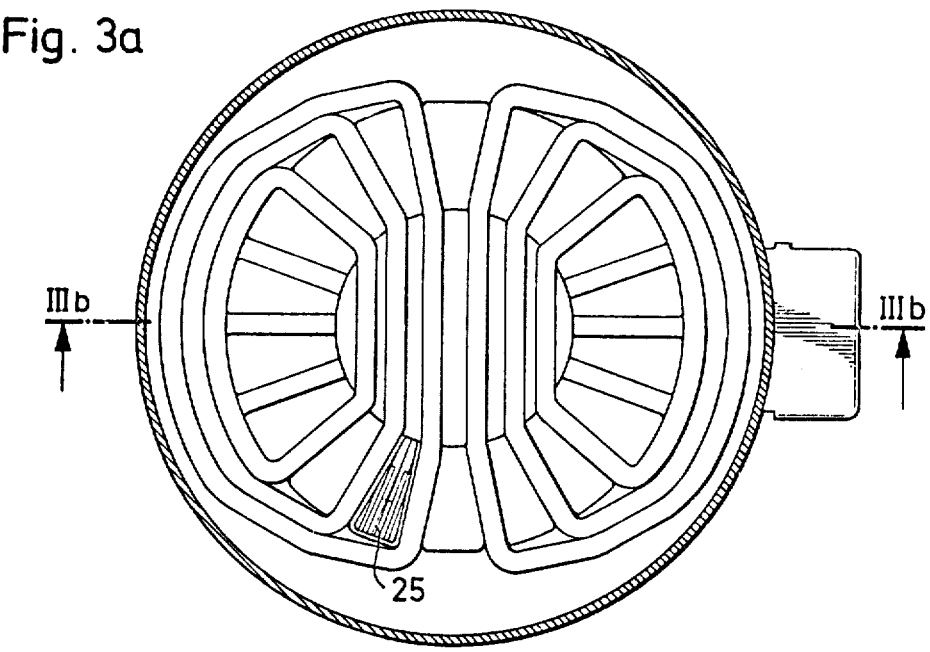
Figure 3B:
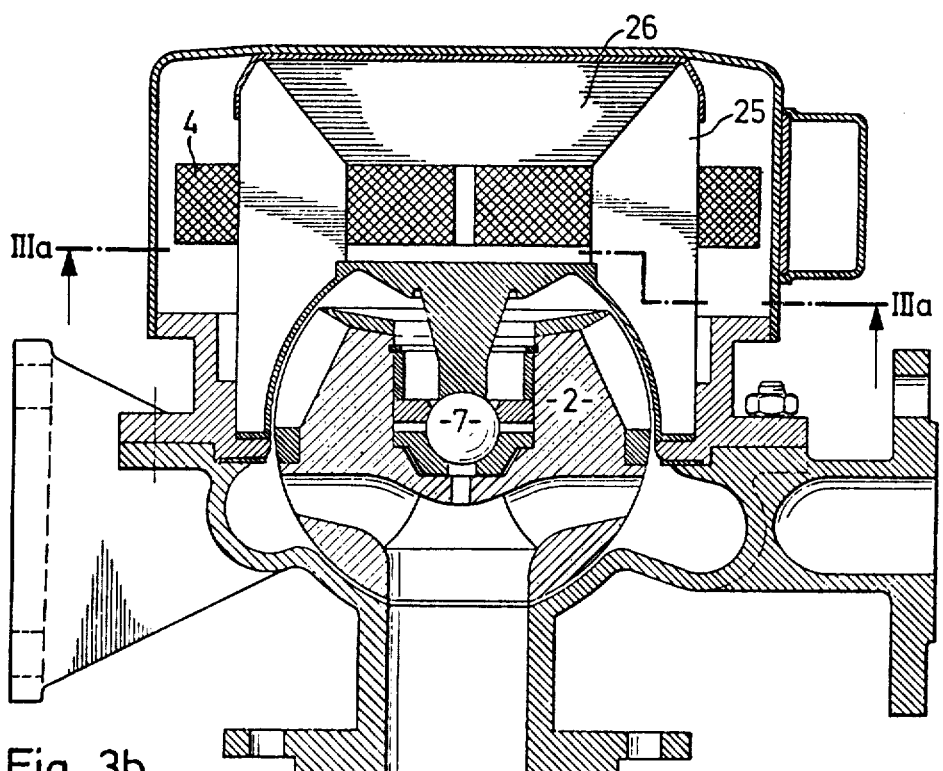

FIG. 3 shows a similar arrangement as FIG. 2 in which, however, the magnetic loop closure disc stack of laminations 36 is not stepped, but is machined into a conical frustrum, whilst the teeth 35 are machined to a concave conical shape.

I claim:

1. An electric motor including a stator having a plurality of radially extending magnetically soft iron elements forming pole teeth having portions of greater and lesser diameters, a rotor at one axial end of said pole teeth adapted to conduct magnetic flux between said pole teeth, and a magnetic closure loop element at the opposite axial end of said pole teeth than said rotor having portions thereof which are associated with portions of said pole teeth; the improvement comprising in that the cross-sectional areas of a portion of said closure loop element associated with a portion of said pole teeth of greater diameter is greater than the cross-sectional area of a portion of said closure loop element associated with a portion of said pole teeth of lesser diameter.

2. An electric motor according to claim 1 wherein the magnetic loop closure element comprises sheet metal material.

3. An electric motor according to claim 2 wherein the magnetic loop closure element comprises nested sheet metal rings.

4. An electric motor according to claim 2 wherein said magnetic loop closure element comprises spirally wound strips.

* * * * *